United States Patent [19]

Nabetani et al.

[11] 3,922,569

[45] Nov. 25, 1975

[54] POTENTIAL DETECTOR

[75] Inventors: Hiroshi Nabetani; Atsushi Ueda; Kosaku Uota; Mitsuaki Ishii, all of Himeji, Japan

[73] Assignee: Mitsubishi Denki Kabushiki Kaisha, Tokyo, Japan

[22] Filed: Jan. 22, 1974

[21] Appl. No.: 435,578

[30] Foreign Application Priority Data

Jan. 27, 1973 Japan ............................... 48-11278

[52] U.S. Cl.............. 307/235 R; 307/313; 315/132; 340/248 B; 340/248 C; 340/251

[51] Int. Cl.[2] .. H03K 5/20; H01J 7/42; H05B 37/03

[58] Field of Search................ 307/235 R, 311, 313; 315/131, 132; 340/248 A, 248 B, 248 C, 251

[56] References Cited

UNITED STATES PATENTS 3,631,528 12/1971 Green ............................ 307/313 X

*Primary Examiner*—John Zazworsky

*Attorney, Agent, or Firm*—Wenderoth, Lind & Ponack

[57] ABSTRACT

A p and an n channel MOS field effect transistor have their drains connected together to an output terminal, their gates connected together to an input terminal and their sources connected across a dc source to form an inverter. A plurality of such inverters having different threshold voltages are connected at their input terminal to an analog member to be detected. The threshold voltage of each inverter is determined by a ratio of mutual conductance of one to the other of the drain and source between the two mating transistors.

1 Claim, 5 Drawing Figures

POTENTIAL DETECTOR

BACKGROUND OF THE INVENTION

This invention relates to a detector device for detecting electric potentials.

It is usually difficult to detect analog values by logic elements. For example, in the case a detection section for detecting levels of voltage is operatively coupled to a logic section, it is required to compose the detection section of discrete elements even though the logic section would be formed into an integrated circuit which is abbreviated hereinafter to an IC. Alternatively the detection section may be formed of a linear IC or IC's while the logic section is formed of a digital IC or IC's. However if the control function is complicated and the number of components is increased, then whatever components can be formed into their own IC's can be so formed separately in view of the standpoint of the miniaturization and increase in reliability of the system. In that case the linear portion would be made simple but it is difficult to form the digital portion in the same chip as the linear portion. In addition, the digital IC into which bipolar transistors, MOS (metal-oxide-semiconductor) field effect transistors and/or C-MOS (complementary metal-oxide-semiconductor) field effect transistors are practically formed is complicated in construction. Therefore it is also difficult to operatively couple one to the other.

Accordingly it is an object of the present invention to overcome these difficulties by the utilization of the characteristics of complementary MOS field effect transistors.

SUMMARY OF THE INVENTION

The present invention provides a detector device for detecting electric potentials, comprising a plurality of complementary MOS field effect transistors including respective input terminals and having different ratios of mutual conductance between p channel MOS field effect transistors and the associated n channel MOS field effect transistors, and a common analog detected member connected to all said input terminals of said complementary MOS field effect transistors.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

The present invention is based upon the fact that an input threshold voltage to complementary MOS field effect transistors including a p and an n channel MOS field effect transistor can be controlled by changing a ratio of a mutual conductance between the p and n transistors.

Figure 1:
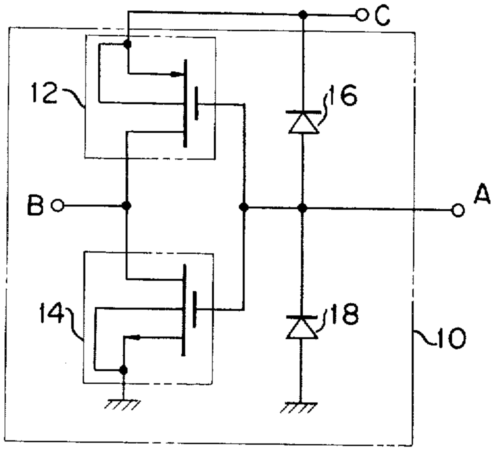
FIG. 1 is an electric circuit diagram of an inverter employing complementary MOS field effect transistors.

Referring now to the drawings and FIG. 1 in particular, there is illustrated an inverter generally designated by the reference numeral 10 and employing complementary MOS field effect transistors. The arrangement illustrated comprises a p channel MOS field effect transistor 12 and an n channel MOS field effect transistor 14 including interconnected gate electrodes connected to an input terminal A to the inverter 10 and interconnected drain electrodes connected to an output terminal B thereof. The p channel MOS field effect transistor 12 has a source electrode connected to a source of electric power designated by the reference character C and the n channel MOS field effect transistor 14 has a source electrode connected to ground. A semiconductor diode 16 is connected across the source and gate electrodes of the p channel field effect transistor 12 and another semiconductor diode 18 is connected across the gate and source electrodes of the n channel field effect transistor 14. That is, the diodes 16 and 18 are serially interconnected between the source C and ground and the junction thereof is connected to input terminal A to protect the gate of the inverter circuit 10 against an excessive input voltage.

In operation, an electric potential higher than an input threshold voltage to the inverter 10 is applied to the input terminal A to provide a ground potential or a null voltage at the output terminal B. On the contrary, if electric potential less than the threshold voltage is applied to the input terminal A then a voltage E across the source C appears at the output terminal B. The input threshold voltage is designated hereinafter by the reference characters Vth. The threshold voltage Vth of the inverter 10 is determined by a ratio of mutual conductance gm of one to the other of the source and drain between the p and n channel MOS field effect transistors 12 and 14, respectively.

Figure 2:
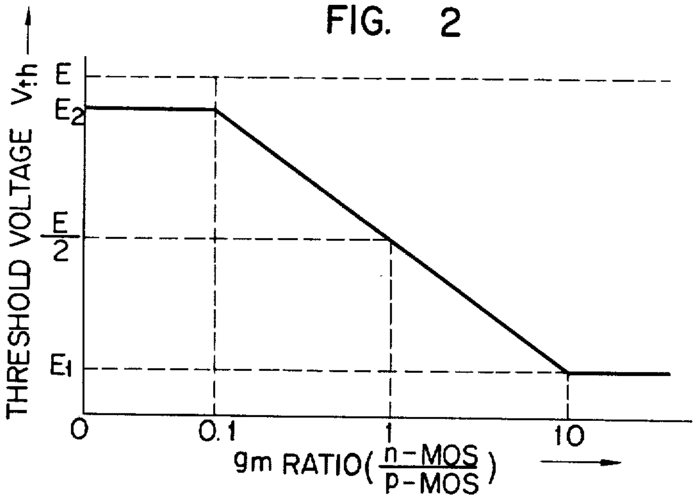
FIG. 2 is a graph illustrating the characteristic of a complementary MOS transistor.

FIG. 2 shows the threshold voltage Vth in ordinate plotted against a ratio of mutual conductance gm of the n transistor 14 to that of the p transistor 12 in abscissa. As seen in FIG. 2, a gm ratio of unity (1) causes the threshold voltage Vth to be one half the source voltage E, or E/2. If the p channel MOS field effect transistor 12 has a smaller gm than the n channel MOS field effect transistor 14, then the threshold voltage Vth has a value less than 1/2. If the gm ratio is equal to or more than 10 then the threshold voltage Vth reaches a predetermined fixed voltage of $E_1$ which is a threshold voltage across the source and gate inherent to the n channel MOS field effect transistor 14.

On the other hand, if the value of the gm ratio decreases below unity (1) then the threshold voltage Vth has a value greater than E/2. Values of the gm ratio in excess of 0.1 provide a predetermined fixed value $E_2$ of the threshold voltage that is equal to a threshold voltage across the source and gate inherent to the p channel MOS field effect transistor 12.

Figure 3:
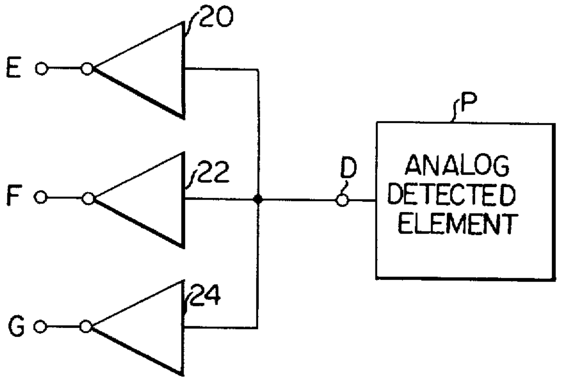
FIG. 3 is an electric circuit diagram of a detector device for detecting electric potentials in accordance with the principles of the present invention.

Referring now to FIG. 3, there is illustrated an embodiment of the present invention. The arrangement illustrated comprises a plurality, in this case, three of inverters 20, 22 and 24 having individual inputs connected together to an input terminal D and subsequently connected to a single analog detected element P. Each of the inverters 20, 22 and 24 is of the circuit configuration as shown in FIG. 1, and includes its own output terminal E, F or G. Further the inverters 20, 22 and 24 have respective threshold voltages $V_{20}$, $V_{22}$ and $V_{24}$ different from one another.

Figures 4, 5:
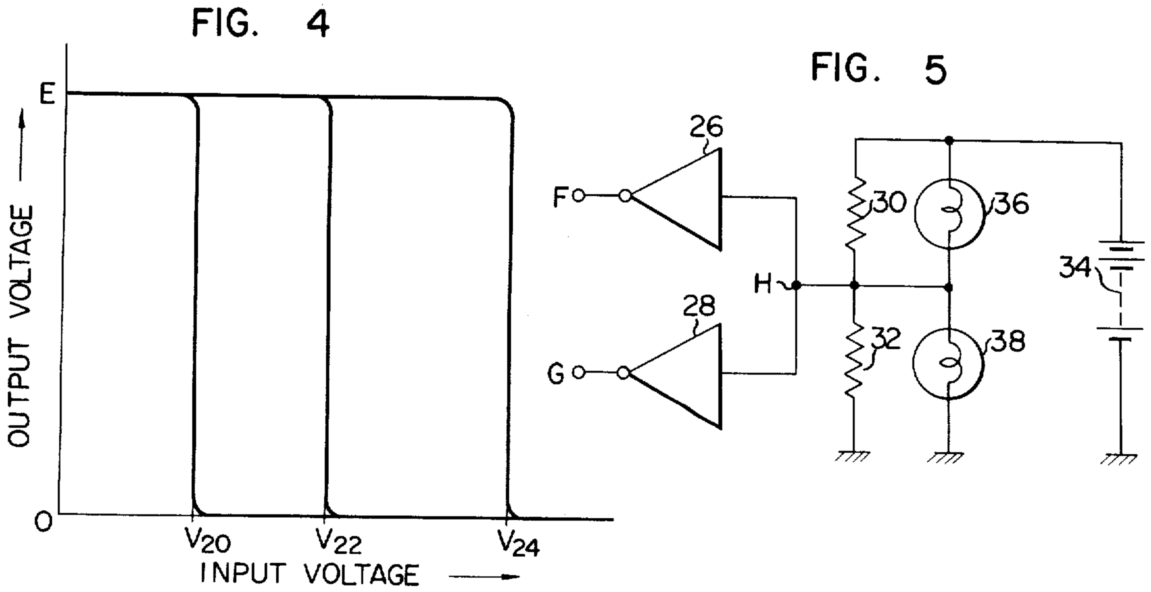
FIG. 4 is a graph useful in explaining the operation of the arrangement shown in FIG. 3.
FIG. 5 is an electric circuit diagram of a modification of the present invention.

The arrangement has the characteristic such as shown in FIG. 4 wherein an input voltage to the arrangement is plotted in abscissa against an output voltage therefrom or voltages developed at the outputs E, F and G of the inverters 20, 22 and 24 as shown in FIG. 3.

As shown in FIG. 4, a ground voltage applied as an input voltage to the input terminal D yields a source voltage E at all the output terminals E, F and G of the inverters 20, 22 and 24. When the input voltage to the inverters 20, 22 and 24 gradually increases in value so that it successively reaches the threshold voltages $V_{20}$, $V_{22}$ and $V_{24}$, the inverters 20, 22 and 24 decrease the output from the source voltage E to the ground voltage, one after another and in the named order. A further increase in the input voltage in excess of the voltage $V_{24}$ causes all the output voltages from the inverters 20, 22 and 24 to be equal to the ground voltage.

From the foregoing it will be appreciated that by changing the gm ratios of the inverters as above described in conjunction with FIGS. 1 and 2 by small increments while increasing the number of inverters, an arrangement such as shown in FIG. 3 can form an analog to digital converter.

FIg. 5 shows a modification of the present invention for detecting the failure of electrical lamps. In FIG. 5, a pair of inverters 26 and 28 are shown as including a common input terminal H connected to the junction of a pair of serially connected resistors 30 and 32 connected across a source of direct current 34, having a negative side connected to ground. Further, each resistor 30 or 32 has an electrical lamp 36 or 38 connected thereacross. The inverters 26 and 28 include individual output terminals F and G respectively. Each of the inverters 26 or 28 includes a pair of complementary MOS field effect transistors having different gm ratios as above described in conjunction with FIGS. 1 and 2.

It is assumed that the inverters 26 and 28 have their threshold voltages preset to be equal to the voltages of $V_{20}$ and $V_{24}$ as shown in FIG. 4 and that the inverters 26 and 28 have a potential at the common input terminal H whose value is equal to the voltage $V_{22}$ (see FIG. 4) set by the electrical lamps 36 and 38. The lamps 36 and 38 have smaller resistances than the mating resistors 30 and 32. Further a ratio of resistance between the lamps 36 and 38 is substantially equal to that between the resistors 30 and 32.

In the normal operation of both lamps 36 and 38 or upon the failure of both lamps, the input terminal H has a potential corresponding to the voltage $V_{22}$. Therefore the output F of the inverter 26 is at the ground potential while the output G of the inverter 28 is at the source voltage E. If one of the lamps, for example, the lamp 36 has been burned out then the input terminal H has a voltage less than the voltage $V_{20}$. Thus the output from the inverter 26 changes from the ground potential to the source voltage E. On the contrary, the failure of the lamp 38 causes the voltage at the input terminal H to be higher than the voltage $V_{24}$, thereby to change the voltage at the output terminal G of the inverter 28 from the source voltage E to the ground potential.

From the foregoing it will be appreciated that in the arrangement of FIG. 5, the source voltage E at the output terminals F and G of the inverters 26 and 28 indicates the failure of the electrical lamp 36 while the ground potential at these output terminals indicates the failure of the electrical lamp 38.

In summary, the present invention is characterized in that complementary MOS field effect transistors usually utilized to effect digital control rather than analog control are used to detect potential levels having analog values by having different ratios of mutual conductance between the mating p and n channel MOS field effect transistors involved, that is to say, by changing a threshold voltage of each of the complementary MOS field effect transistors. Accordingly, the present invention makes it possible to form relatively simple analog to digital converters and also to effect the control of analog values such as the voltage comparison with a simple circuit configuration. In addition, the complementary MOS field effect transistors used can be assembled into an integrated circuit or even into a large scaled integrated circuit in a common chip with the associated digital portion, resulting in a decrease in the number of components.

While the present invention has been illustrated and described in conjunction with a few preferred embodiments thereof it is to be understood that various changes and modifications may be restored to without departing from the spirit and scope of the present invention.

What we claim is:

1. A detector device for detecting electric potentials wherein said device includes a plurality of pairs of complementary MOS field effect transistors having respective input terminals connected together, an analog detected member comprised of a pair of electric lamps serially connected across source of direct current and one resistor connected across each of said electric lamps, said resistors having therebetween a ratio of a value of resistance substantially equal to that between said electrical lamps and being higher in the value of resistance than said electrical lamps, and wherein a point at which said electrical lamps are serially interconnected is connected to a common input terminal while in the normal operation of said electrical lamps, said common input terminal has a potential higher than a threshold voltage of one of said pairs of complementary MOS field effect transistors and lower than a threshold voltage of the other complementary MOS field effect transistors.

* * * * *